United States Patent [19]

Meyers

[11] Patent Number: 5,624,123
[45] Date of Patent: Apr. 29, 1997

[54] PIPE SEAL ASSEMBLY FOR POURED CONCRETE ON-SITE WASTE DISPOSAL SYSTEM COMPONENTS

[75] Inventor: Theodore W. Meyers, Inverness, Ill.

[73] Assignee: Tuf-Tite, Inc., Wauconda, Ill.

[21] Appl. No.: 241,019

[22] Filed: May 11, 1994

[51] Int. Cl.$^6$ ........................................ F16J 15/10
[52] U.S. Cl. .................... 277/9; 277/152; 277/207 A; 277/212 F; 285/4
[58] Field of Search .................... 277/207 A, 9, 277/212 F, 212 R, DIG. 10, 152; 285/4; 220/270

[56] References Cited

U.S. PATENT DOCUMENTS

| | | |
|---|---|---|
| 1,258,884 | 3/1918 | Fife . |
| 1,278,120 | 9/1918 | Donnelly . |
| 1,592,454 | 7/1926 | Fredrickson . |
| 1,926,197 | 9/1933 | Durr .................................. 285/193 |
| 2,202,147 | 5/1940 | Gerriets . |
| 2,244,280 | 6/1941 | Aghnides ............................ 285/90 |
| 2,252,240 | 8/1941 | Tschappat ........................... 288/5 |
| 2,897,533 | 8/1959 | Bull et al. .......................... 16/2 |
| 3,048,911 | 8/1962 | Almon . |
| 3,123,939 | 3/1964 | Erikson . |
| 3,221,881 | 12/1965 | Weiler et al. . |
| 3,276,176 | 10/1966 | Jonsson et al. . |
| 3,363,799 | 1/1968 | Zurcher et al. ..................... 220/42 |
| 3,385,012 | 5/1968 | Lovegreen .......................... 52/21 |
| 3,408,091 | 10/1968 | Zylstra ............................... 285/7 |
| 3,467,271 | 9/1969 | Kaiser et al. . |
| 3,516,679 | 6/1970 | Schmitt .............................. 277/51 |
| 3,521,414 | 7/1970 | Malissa . |
| 3,602,530 | 8/1971 | Elwart ............................... 285/4 |
| 3,654,965 | 4/1972 | Gramain ............................ 285/4 |
| 3,731,448 | 5/1973 | Leo ................................... 52/594 |
| 3,731,952 | 5/1973 | Elwart ............................... 285/3 |
| 3,759,285 | 9/1973 | Yoakum ............................. 137/363 |
| 3,787,061 | 1/1974 | Yoakum ............................. 277/164 |

(List continued on next page.)

FOREIGN PATENT DOCUMENTS

| | | |
|---|---|---|
| 269007 | 3/1969 | Austria . |
| 275421 | 11/1927 | Canada . |
| 964043 | 3/1975 | Canada . |
| 684106 | of 1930 | France . |
| 2138502 | 2/1973 | Germany ........................... 277/207 A |
| 142578 | 7/1980 | Germany . |
| 3136315 | 3/1983 | Germany . |
| 3803729 | 8/1989 | Germany ........................... 277/207 A |
| 1211238 | 11/1970 | United Kingdom . |
| 81/03535 | 12/1981 | WIPO ................................. 277/207 A |

OTHER PUBLICATIONS

Christy Concrete Products, Inc., Emeryville, California, 1967 p. 311.
Bowco Industries Inc., Duct Terminators and Couplings, (undated), whole document.
United Concrete Products, Inc. (Yalesville, Connecticut) brochure Nov. 1985.
Tuf–Tite, Inc. brochure.

*Primary Examiner*—William A. Cuchlinski, Jr.
*Assistant Examiner*—John L. Beres
*Attorney, Agent, or Firm*—Tilton, Fallon, Lungmus & Chestnut

[57] ABSTRACT

An improved pipe seal assembly for use in the walls of a poured concrete tank or box in an on-site waste disposal system, a drainage system, and other poured concrete structures, the assembly including a seal member having an inclined, frusto-conical shaped wiper flange which is integrally connected by a living hinge to a cylindrical seal body, the wiper flange initially extending outwardly when the seal member is formed, such as by injection molding, but then folded inwardly about the living hinge member to its normal operating position. The improved pipe seal assembly includes an integrally-formed tearaway membrane, which has a pull tab member and associated score lines, to permit the membrane's selective removal when desired, thereby allowing the seal member to slideably receive a pipe extended through the folded wiper blade. The inwardly folded wiper flange also acts to releasably retain a mandrel to permit in-place casting of the improved pipe seal assembly within the wall of a poured concrete box or tank member.

7 Claims, 2 Drawing Sheets

U.S. PATENT DOCUMENTS

| | | | |
|---|---|---|---|
| 3,796,406 | 3/1974 | Ditcher | 249/11 |
| 3,800,486 | 4/1974 | Marvey | 52/98 |
| 3,802,466 | 4/1974 | Panella | 138/89 |
| 3,813,107 | 5/1974 | Ditcher | 277/189 |
| 3,832,438 | 8/1974 | Ditcher | 264/274 |
| 3,848,074 | 11/1974 | Channell | 174/38 |
| 3,857,589 | 12/1974 | Oostenbrink | 285/110 |
| 3,943,971 | 3/1976 | Schmunk | 137/610 |
| 3,973,783 | 8/1976 | Skinner et al. | 277/190 |
| 3,982,777 | 9/1976 | Martin | 285/192 |
| 4,007,941 | 2/1977 | Stancati | 277/178 |
| 4,020,868 | 5/1977 | Schmunk | 137/610 |
| 4,022,496 | 5/1977 | Crissy et al. | 285/3 |
| 4,073,048 | 2/1978 | Ditcher | 29/450 |
| 4,079,193 | 3/1978 | Channell | 174/138 F |
| 4,097,380 | 6/1978 | Carlson | 210/170 |
| 4,103,901 | 8/1978 | Ditcher | 277/9.5 |
| 4,128,107 | 12/1978 | Blumhardt | 137/318 |
| 4,139,005 | 2/1979 | Dickey | 138/89 |
| 4,140,337 | 2/1979 | Arcella et al. | 285/3 |
| 4,159,829 | 7/1979 | Ditcher | 277/189 |
| 4,230,157 | 10/1980 | Larsen et al. | 138/155 |
| 4,298,470 | 11/1981 | Stallings | 210/170 |
| 4,318,547 | 3/1982 | Ericson | 277/207 A |
| 4,333,662 | 6/1982 | Jones | 277/207 A |
| 4,345,998 | 8/1982 | Graffis et al. | 210/164 |
| 4,346,921 | 8/1982 | Gill et al. | 285/110 |
| 4,350,351 | 9/1982 | Martin | 277/207 |
| 4,387,900 | 6/1983 | Ditcher et al. | 277/101 |
| 4,394,919 | 7/1983 | Von Alven et al. | 220/270 |
| 4,406,484 | 9/1983 | Ramer | 285/178 |
| 4,421,322 | 12/1983 | Ruch et al. | 277/212 R |
| 4,426,095 | 1/1984 | Buttner | 277/207 A |
| 4,440,406 | 4/1984 | Ericson | 277/207 A |
| 4,456,146 | 6/1984 | Helms | 220/270 |
| 4,508,355 | 4/1985 | Ditcher | 277/189 |
| 4,563,847 | 1/1986 | Hasty | 52/219 |
| 4,566,704 | 1/1986 | Van Dongeren | 277/207 A |
| 4,602,504 | 7/1986 | Barber | 73/49.8 |
| 4,625,976 | 12/1986 | Gilbert | 277/12 |
| 4,625,998 | 12/1986 | Draudt et al. | 285/7 |
| 4,663,036 | 5/1987 | Strobl, Jr. et al. | 210/170 |
| 4,732,397 | 3/1988 | Gavin | 277/207 |
| 4,744,571 | 5/1988 | Geberth, Jr. | 277/208 |
| 4,805,920 | 2/1989 | Gavin | 277/207 |
| 4,809,994 | 3/1989 | Skinner et al. | 277/207 |
| 4,846,506 | 7/1989 | Bocson et al. | 285/4 |
| 4,902,043 | 2/1990 | Zillig et al. | 285/4 |
| 4,951,914 | 8/1990 | Meyers et al. | 249/11 |
| 5,000,491 | 3/1991 | Bartholomew | 285/319 |
| 5,036,636 | 8/1991 | Hasty | 52/100 |
| 5,043,536 | 8/1991 | De Bartolo, Jr. | 174/65 R |
| 5,106,127 | 4/1992 | Briet | 285/4 |
| 5,222,334 | 6/1993 | Hasty | 285/4 |
| 5,286,040 | 2/1994 | Gavin | 277/207 |
| 5,303,838 | 4/1994 | Luch et al. | 220/270 |

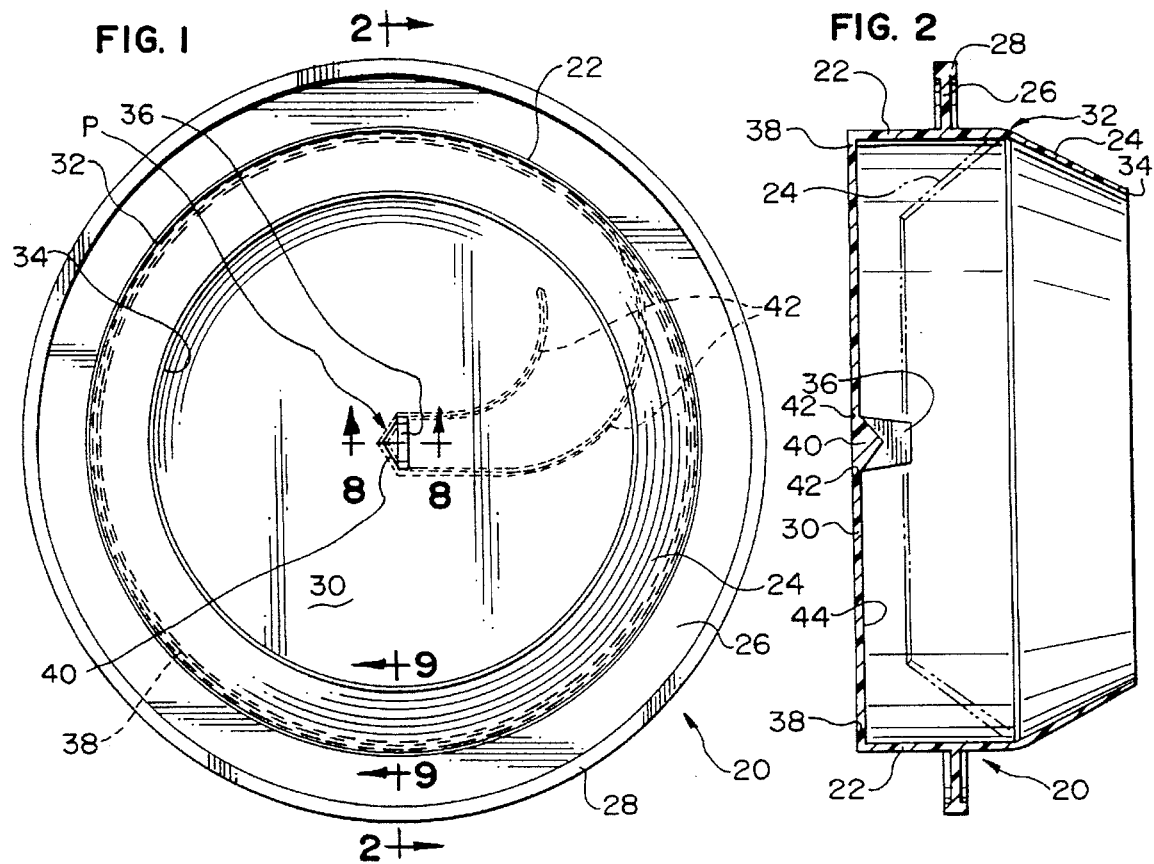
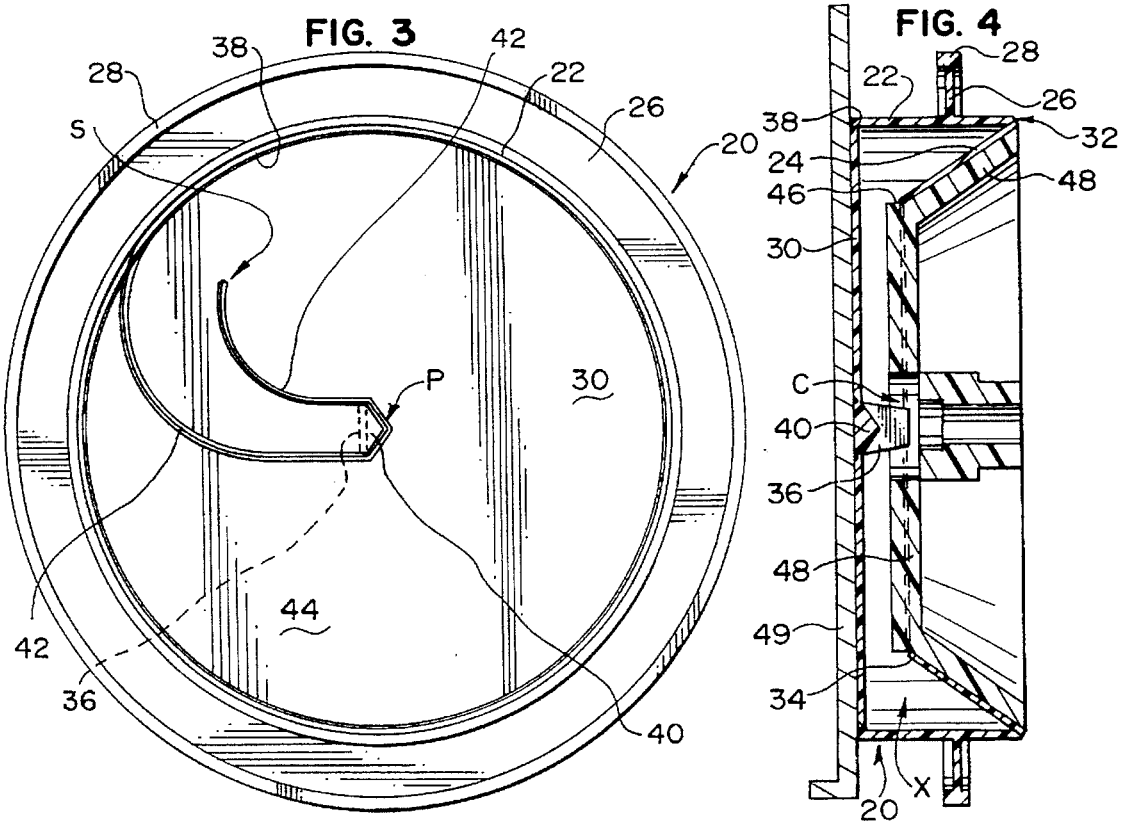

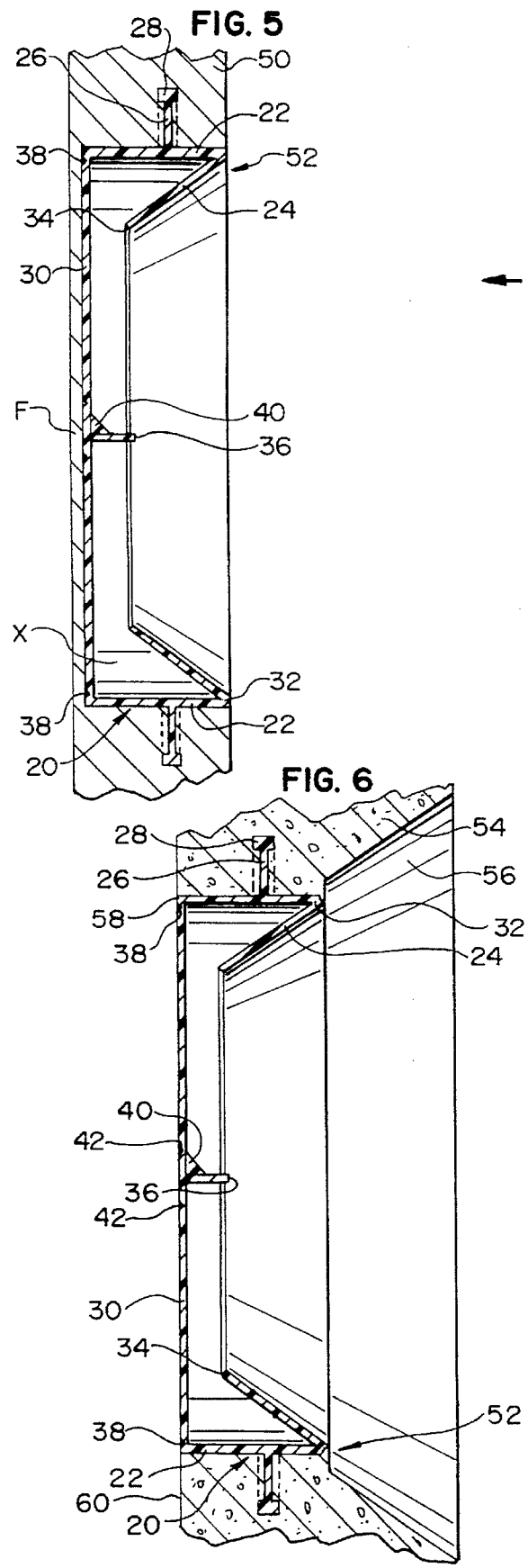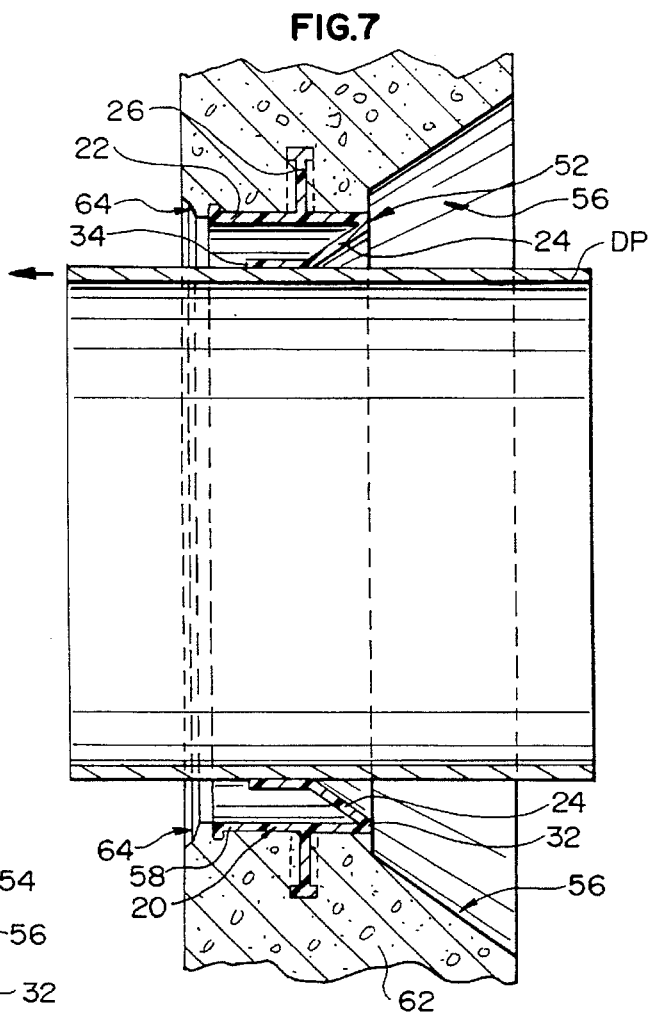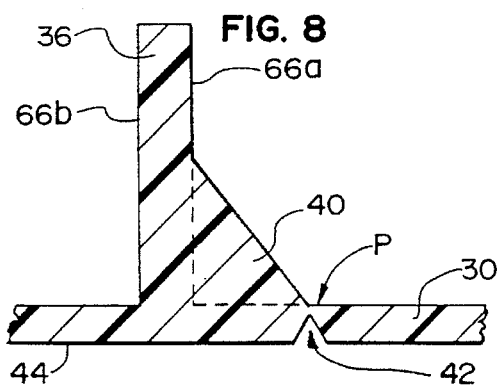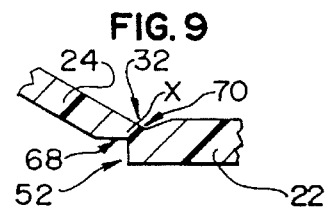

5,624,123

PIPE SEAL ASSEMBLY FOR POURED CONCRETE ON-SITE WASTE DISPOSAL SYSTEM COMPONENTS

BACKGROUND AND SUMMARY OF THE INVENTION

This invention relates to polymer pipe seal assemblies for use in on-site waste disposal systems, such as to be cast in the side walls of a poured concrete septic tank, drop box, distribution box, and the like, and which seal assemblies are able to slideably receive a drainpipe extended therethrough.

There have been several attempts to provide plastic seals which can be cast into the walls of a poured concrete septic system component during its formation. However, certain problems have arisen with several of these attempts. U.S. Pat. Nos. 4,732,397, 4,805,920, and 5,286,040 disclose one type of pipe seal for use in concrete box walls. It is formed as a one piece unit with an integrally-formed membrane covering off the opening of its wiper seal member. However, that type pipe seal design has numerous disadvantages. One is that the user has to be very careful in removing the membrane from the operating end of the wiper seal. For example, if the wiper's operating end is at all torn or if the membrane is not properly removed (e.g., leaves a jagged edge or instead too much membrane is removed), pipe sealing problems can arise. That is, either the wiper blade will tear further and become inoperable when a pipe is inserted through it, or the membrane will not provide a good watertight seal to the inserted inlet line or drainpipe. Further, since the casting forms used to pour the concrete box walls are often installed at a slant to vertical, this type pipe seal requires the use of specific angled spacer members to assure that the seal is forced completely flat against the mating form wall. However, in the typical concrete casting operation, such precise alignment is rarely achieved, such that poured concrete is often able to undesirably seep behind that type seal's wiper member. The presence of such concrete creates significant sealing problems should a pipe ever be inserted through the wiper seal. Further yet, the commercially available embodiment made in accordance with U.S. Pat. Nos. 4,732,397, 4,805,920, and 5,286,040 include three tearaway lines, i.e., one each for a 2, 3, and 4 inch pipe. However, in actual use, those "extra" tearaway lines act as inherent built-in failure points. That is, if one of such tearaway lines does not fail from associated backfill pressure exerted against the membrane, then often another one will.

U.S. Pat. No. 4,951,914 (owned by the assignee of the subject invention) discloses a two-piece pipe seal assembly which has a primary seal body with an integrally joined wiper blade, and a separate knock-out plug member which fits within an interior groove formed in the seal body's inner wall. However, that seal has the disadvantage that two pieces are required to be produced, shipped, assembled, and used. Further, unless some thickness of concrete "flash" is present (behind the membrane) to maintain the separate knock-out member in position vis-a-vis the seal body, backfill forces can push against that knock-out member sometimes causing it to be displaced. (Reference is made to U.S. Pat. No. 4,951,914 for a description of the general use, installation and operation of such polymer pipe seal assemblies.)

The improved pipe seal assembly of the present invention overcomes these and other problems with the prior art by providing a one-piece seal member with an integrally-formed tearaway membrane that is located at a position totally remote from the operating end of the seal's frusto-conical shaped wiper member. Thus, should the tearaway membrane need to be removed to permit pipe insertion, that can be done without at all affecting the integrity of the operating, i.e., inner, end of the seal's wiper blade. Further, the tearaway membrane is formed with a gusseted pull tab and appropriately positioned score lines, whereby the membrane can be easily and accurately removed when desired. Importantly, by providing a sturdy pull tab which can be readily gripped by pliers, for example, even thicker remaining dimensions of the tearaway membrane along the score lines can be used, thereby resulting in a stronger tearaway membrane. Further yet, because of the remote positioning of the membrane, then regardless how the seal is aligned during casting (vis-a-vis the mating form wall), there is no ability during casting for concrete to ever seep behind the seal's wiper blade. Thus, the present invention is easy to use, is economical as it is formed as one piece, and yet can be made (i.e., injection-molded) as one piece because the wiper blade is mounted to the seal body by a living hinge member. This advantageous feature allows the wiper blade to be readily cast initially in an outwardly aligned position. Then, during use, it is folded into an inwardly-directed operating position able to accept both the mandrel during box casting, and thereafter sealably receive a drainpipe inserted through it.

Accordingly, it is an object of the present invention to provide a one piece pipe seal assembly having a wiper blade connected to the seal body by a living hinge member, and including an integrally-formed tearaway membrane member which seals off the seal assembly at a position remote from the wiper blade's operating end.

It is a further object of the present invention to provide a tank seal assembly that is economical in manufacture and use, and which assures that no concrete can enter behind the wiper blade during the casting process within a poured concrete box wall regardless how the seal assembly is aligned on the casting mandrel.

It is a still further object of the present invention to provide a pipe seal assembly that can be cast in place in a concrete tank wall and which has an integrally-formed tearaway membrane that is so structured as to provide a permanent watertight seal when the pipe seal is not being used to receive a drainpipe.

It is another object of the present invention to provide a pipe seal assembly that is of a design that can be used with casting mandrels from various third party seal manufacturers.

Other objects and advantages of the invention may be seen in the details of the ensuing specification.

BRIEF DESCRIPTION OF THE DRAWINGS

The invention is explained in conjunction with the accompanying drawings, in which:

FIG. 1 is a front elevation view of the improved seal member and viewed from the side presenting the wiper blade member;

FIG. 2 is a cross sectional view of the seal member of FIG. 1, as viewed along lines 2—2 of FIG. 1, and depicting in phantom the wiper blade in its folded position;

FIG. 3 is a rear elevation view of the seal member of FIG. 1;

FIG. 4 is a side cross sectional view of the seal member of FIG. 1, similar to FIG. 2, but as mounted on a mandrel;

FIG. 5 is a fragmentary sectional view of the seal of FIG. 1, depicted as cast in place in a tank wall, with a concrete flash present, and prior to removal of the tearaway membrane;

FIG. 6 is similar to FIG. 5, but shown without the presence of concrete flash and with the use of a spacer member during casting;

FIG. 7 is yet another fragmentary sectional view of the present seal assembly as cast in a box wall, showing the tearaway membrane removed, and a pipe installed through the seal's wiper blade;

FIG. 8 is an enlarged fragmentary cross section view of the gusseted pull tab portion of the present seal's tearaway membrane; and FIG. 9 is a rotated and enlarged fragementary cross section view of the "living hinge" connection of the present seal's wiper blade to the seal's cylindrical body member.

DETAILED DESCRIPTION OF THE PREFERRED EMBODIMENT

In the illustration given, wherein like reference numerals indicate corresponding elements, and with reference to FIG. 1, reference numeral 20 generally designates the seal assembly of the present invention. Seal assembly 20 includes a cylindrical seal wall member 22, a radially inwardly projecting, frusto-conical shaped wiper blade member 24, a radially outwardly projecting integral anchor flange 26, and a generally axially extending flange 28 formed at the periphery of flange 26. Also seen in FIG. 1 is that portion as visually exposed of the integrally formed tearaway membrane 30, which membrane extends completely across the end of seal wall member 22 so as to cover, i.e., seal off, the same. The wiper blade member 24 is integrally connected to the wall member 22 by a living hinge 32 (described more fully below), and at its other end has a free or operating end 34. As will be seen, the integrity of the free end 34 is critical in the proper operation of the seal assembly 20 to receive and retain a drainpipe in a watertight sealed condition.

FIG. 2 depicts the seal assembly 20 in cross section and shows the living hinge 32 integrally attaching the wiper blade 24 to the cylindrical seal wall 22. A pull tab member 36 is integrally formed preferably at the center of membrane 30 and projects inwardly, i.e., into the interior of the seal member 20. A peripheral score line 38 is formed at the juncture of membrane 30 with cylindrical seal wall 22, to permit ready removal, i.e., severance, of membrane 30. There is also shown in FIG. 2 (in phantom outline) the position of the wiper blade 24 after it has been folded, i.e., manually flipped, inwardly about its living hinge 32. FIG. 2, thus, reflects in solid lines the actual outwardly-projecting position of wiper blade 24 when the seal assembly 20 is manufactured (i.e., preferably by injection molding), while in phantom lines there is shown the wiper blade's inwardly folded position for use when the seal assembly 20 is fitted on a mandrel 48 (see FIG. 4) for casting into a concrete box wall, as well as for sealably receiving a pipe component inserted therethrough.

In FIG. 3 is shown the peripheral score line 38, the pull tab member 36 (in phantom lines), and a pryamid-shaped pull tab support gusset 40 (formed integrally between the tearaway membrane 30 and the pull tab 36, and rising to support the latter—see also FIG. 2). Further, a configured arcuate-shaped score line 42 starts at point S (in FIG. 3), curves concavely towards the pull tab member 36, is generally triangularly-shaped as it abuts the support gusset 40, and then is generally concavely shaped through the central portion of the tearaway membrane 30 until it tangentially joins the outer or peripheral score line 38.

As best seen in FIGS. 2 and 3, the respective score lines 38, 42 are formed as depressions or V-shaped notches on the exterior side 44 of membrane 30; the interior side of tearaway membrane 30, i.e., that opposite from score lines 38, 42, is preferably smooth-walled. In one embodiment made in accordance with the present invention, the tearaway membrane 30 was approximately 0.060 in. thick, while the thickness of the membrane along each of the score lines 38, 42 was only approximately 0.010 in. thick. Preferably, the entire seal assembly 20 is formed as an injection-molded plastic component, and is preferably made of linear low density polyethylene. One preferred linear low density polyethylene material used to mold the seal assembly 20 is sold by Dow Chemical Company, as its product "DOWLEX 2517".

In FIG. 4 there is shown a seal assembly 20 which has the free end 34 of its inwardly-folded wiper blade 24 releasably retained, i.e., snap-fitted, upon the cylindrical mouth portion 46 or gripper element of a suitable casting mandrel 48. (Reference is again made to the description found in U.S. Pat. No. 4,951,914 for how a mandrel is used to grip and hold a pipe seal assembly, via its flexible wiper blade, in ready position for casting-in-place within the side wall of a poured concrete box, such as a poured concrete septic tank wall.) In any event, as seen, the projecting mouth portion 46 of mandrel 48 acts to slightly stretch the free end 34 of wiper blade member 24, thereby to tightly, but releasably, retain the same on the mandrel during the casting process. Mandrel mouth portion 46 is somewhat removed from the inner surface 44 of the tearaway membrane 30. Also, the inwardly projecting pull tab member 36 of membrane 30 lies within a cavity (labelled "C" in FIG. 4) formed within the mandrel mouth 46.

During the casting process, the mandrel 48 is attached to a casting form side wall (not shown) through use of an appropriate threaded fastener or other connector (not shown). Thereafter, once the seal member 20 (as held on a mandrel 48) has been cast within a concrete tank wall (not shown), the mandrel mouth 46 is released, i.e., removed, from the wiper blade's free end 34 at the time the casting form side wall (not shown) is removed, i.e., stripped, from the tank wall. Thus, it will be seen that no concrete or other undesired material can seep or otherwise flow into the area noted by reference letter X, i.e., that important free area behind the wiper blade 24, even should the seal assembly 20 not be placed totally flush against the mating inner form wall 49. This is because both the mandrel 48 and the integral membrane 30 prevent anything from entering that space X, regardless of the actual positioning or canting of seal member 20 vis-a-vis the opposing form wall 49.

There is shown in FIG. 5 a relatively thin tank wall 50 (formed of poured concrete) in which an improved seal 20 has been cast in place. As seen, the receiving end 52 of seal 20 (which end includes the living hinge 32) has been so cast as to lie flush with the right side (see FIG. 5) of tank wall 50. However, in the typical installation in which the receiving end 52 is formed flush with the tank wall 50, i.e., usually for a wall thickness of approximately 1½ inches, there is created during casting a concrete flash (marked "F" in FIG. 5) as situated behind the tearaway membrane 30. It is to be understood that while not at all necessary to preserve the structural integrity of tearaway membrane 30, that flash F actually aids in keeping seal 20 as a "closed" seal, i.e., one in which the flash F and membrane 30 remain present such that a drainpipe (not shown in FIG. 5) cannot be slidably received within the wiper blade's free end 34. This feature is quite helpful when such a cast-in-place seal 20 is to remain closed, as occurs in multiple-port tanks where only one or two openings, for example, are actually needed to sealably receive drain lines. The anchor flange 26 and axial flange 28 help retain the seal assembly 20 in place once seal 20 is cast in concrete.

Turning to FIG. 6, a seal assembly 20 is there shown as having been cast within a somewhat thicker tank wall 54, again formed of poured concrete. An enlarged chamferred opening 56 is shown created by the use of a spacer member (not shown) during the tank wall casting process. (Reference is again made to U.S. Pat. No. 4,951,914 for a description of the use of such a spacer as mounted atop a mandrel.) However, in this case, even though the tank wall 54 is somewhat wider, for example, approximately 2.5 inches, no concrete flash F is formed and present behind the tearaway membrane 30. The membrane 30 and the outer edge 58 of cylindrical seal wall 22, i.e., the left edge of seal 20 in FIG. 6, lie flush with the left or interior wall surface 60 of thick tank wall 54. Thus, the tank seal assembly 20 can be so positioned on a mandrel 48 as to have its outer edge 58 forced directly against the opposing or inner core wall (for example, see form wall 49 in FIG. 4) when casting such a thick tank wall 54. However, it will also be noted that the outer or receiving end 52 of seal assembly 20, in the specific tank wall construction as shown in FIG. 6, is located internally of the thick tank wall 54, rather than lying adjacent the outer side surface of tank wall 50 in FIG. 5, for example. In any event, the tearaway membrane 30 is of sufficient structural strength as to remain in place when installed, even without the presence of any concrete flash F, due to the specific configuration of the membrane 30 and the score lines 38, 42.

FIG. 7 depicts a seal assembly 20 cast in place in an even thicker concrete tank wall 62; a chamferred spacer opening 56 is present but the concrete flash F has been removed to leave a flashing void or opening 64. As seen, similar to FIGS. 5 and 6, the anchor flange 26 of seal 20 is embedded into the concrete so as to hold the seal 20 in its correct position. Further, the tearaway membrane 30 has already been removed. The latter can be readily accomplished by using a pair of pliers or some other gripping element to pull on the pull tab 36 (i.e., to the right, for example, in FIGS. 6 and 7), until tab 36 and the support gusset 40 cause the pointed base portion "P"(see FIGS. 1, 3, and 8) of the score line 42 to tear open from the remainder of the tearaway membrane 30. Thereafter, further pulling on pull tab 36 causes continued tearing of the score lines 42 (along both sides of tab 36), until the larger of score lines 42 reaches the peripheral score line 38. Yet continued pulling of pull tab 36 then causes the tearaway membrane 30 to be completely severed from cylindrical seal wall 22 (along the remainder of peripheral score line 38). Once the membrane 30 has been fully severed, it can be discarded. Yet this is accomplished without any worry of inadvertently damaging the operating end 34 of wiper blade 24, from which the tearaway membrane and score lines 38, 42 are totally removed.

Then a suitably-sized drainpipe, such as denoted by reference letter "DP" in FIG. 7, can be slideably inserted into the seal assembly 20 from the right side (of FIG. 7), i.e., into the seal's receiving end 52. That is, the pipe DP can be inserted into the flexible wiper blade member 24 (in the direction of the arrow in FIG. 7) until it engages and then stretches slightly outwardly the wiper blade's operating or free end 34. Continued insertion of a pipe DP into free end 34 finally causes the latter to reach its gripping and sealing position shown in FIG. 7. By this process a substantially watertight seal is created about pipe DP by the inwardly directed compression forces of the flexible but stretched wiper blade free end 34.

FIG. 8 depicts a substantially enlarged fragmentary section view of the pull tab 36 and surrounding membrane 30. As seen, the arcuate shaped score lines 42 (as well as the peripheral score line 38 shown in FIGS. 2 and 3, for example) are each formed as a slight V-groove or depression in the exterior surface 44 of tearaway membrane 30. In the preferred embodiment, the score lines 42 (and 38) are each formed as a 60° notch formed in the exterior surface 44 of tearaway membrane 30. However, that V-notched area (comprising the score lines 38 and 42) is not so sufficiently deep as to affect the structural integrity of membrane 30, should the latter be required to be maintained in place during use. In fact, the area of membrane 30 remaining along each of score lines 38, 42 is substantially more structurally secure than that of the membranes of many prior art pipe seal designs; in use the latter often cave in and tear away due to backfill pressure around a buried concrete box. Stated another way, the presence of a pull tab 36 allows the use of a plier, for example, to forcibly remove the membrane 30. Thus, the material of membrane 30 adjacent score lines 38, 42 can be substantially thicker than otherwise, such that the membrane 30 is more structurally secure than many prior art pipe seal devices. Also, as will be noted in FIG. 8, the planer walls 66a, 66b comprising the sides of pull tab 36 are formed with a slight negative slope; this is done solely for the purpose of injection molding.

Turning to FIG. 9 there is shown a substantially enlarged fragmentary section view of the living hinge 32, rotated 180° from its position as shown in FIG. 2, for example. As formed, the peripheral edge of cylindrical seal wall 22, at least towards its receiving end 52, starts to slightly taper in thickness, i.e., creates an annular reduced wall section. Correspondingly, the wall thickenss of the wiper blade 24 also begins to slightly taper at its end opposite from free end 34, i.e., creates an annular reduced wall thickness. Such tapering causes a reduced section connection, as designated by reference letter X in FIG. 9, to be created at the location of living hinge 32. More specifically, a generally perpendicular outer wall angle 68 is formed at the radially outer connection of wiper blade 24 with cylindrical seal wall 22, while an obtuse inner wall angle 70 is formed on the radially inner connection of wiper blade 24 with cylindrical wall 22.

Preferably, as noted in FIG. 9, the apex of angle 68 resides slightly axially outwardly (i.e., to the left in FIG. 9 along cylindrical seal wall 22) from the apex of inner wall angle 70. This preferred specific positioning of the respective apexes of inner and outer wall angles 68, 70 creates the reduced section X of the living hinge 32, which hinged connection is formed annually about receiving end 52 of seal member 20. Importantly, this arrangement operates to create a sufficiently pliable yet structurally strong living hinge 32, all so as to allow wiper blade 24 to be initially formed as projecting outwardly (see FIG. 2), but then later capable of being manually folded or flipped inwardly (see phantom position in FIG. 2 and positions shown in FIGS. 4 and 5) to its normal operating or "use" position.

Further, because of the specific polymer material preferably used (i.e., a suitable linear low density polyethylene material as described above) for seal member 20, the present seal assenmbly's living hinge 32 truly becomes "living". That is, it is flexible enough to permit the required inward "flipping" of wiper blade member 24 (from its initial injection molding position to its inwardly projecting "use" position) without affecting whatsoever its structural integrity. In one embodiment made in accordance with the invention, the thickness of wiper blade 24 was in the range of approximately 0.025 to 0.030 inches, of cylindrical wall 22 was in the range of approximately 0.055 to 0.060 inches, and of the living hinge's cross section X was in the range of nominally 0.015 to 0.020 inches.

Thus, because of the unique structural design of the improved pipe seal assembly of the present invention, and the presence of the living hinge 32, the seal 20 can be inexpensively formed in one piece. Further, it has its tearaway membrane 30 located at a position totally removed from the free operating end of the wiper blade 24. Importantly, the present invention's placement of its tearaway membrane at a position totally remote from the operating end of its wiper blade is a substantial improvement over prior art designs where removal of a seal membrane from the operating or free end of the wiper blade often completely destroyed the flexible wiper's usefulness. Advantageously, because of the presence of the living hinge 32 (between the cylindrical seal wall 22 and the wiper blade 24), the seal 20 is able to be entirely formed as one piece via injection molding, yet still allow its wiper blade to be foldably flipped from an initial outward position to an inwardly directed "use" position. (Any injection molding of a pipe seal component where the wiper blade was permanently inwardly mounted would be commercially impossible to make from an injection mold tooling standpoint.) Further, since the present seal assembly is made as all one piece, including the integrally formed tearaway membrane, there is no need to have the presence of any extra concrete "flash" behind the seal membrane when in use.

Another important feature of the improved pipe seal assembly of the present invention is that it will readily snap-fit into other commercially available mandrels, such as, for example, those available from the owner of U.S. Pat. Nos. 4,732,397, 4,805,920, and 5,286,040.

From the foregoing, it is believed that those skilled in the art will readily appreciate the unique features and advantages of the present invention over previous types of pipe seal apparatus for poured concrete tank walls. Further, it is to be understood that while the present invention has been described in relation to a particular preferred embodiment as set forth in the accompanying drawings and as above described, the same nevertheless is susceptible to change, variation and substitution of equivalents without departure from the spirit and scope of this invention. It is therefore intended that the present invention be unrestricted by the foregoing description and drawings, except as may appear in the following appended claims.

I claim:

1. In an improved seal apparatus for use in on-site waste disposal systems of the type having a poured concrete box member with side walls and a plurality of side wall openings for receiving inlet and outlet lines extending therethrough, the seal apparatus being cast in place in the side wall openings and having a cylindrical seal wall member which has a radially outwardly directed attachment member for casting in place within the side wall of the poured concrete box member for securement thereto, the improved seal apparatus being capable of being held in place during the casting process by a mandrel member having a gripper element for releasably gripping the improved seal apparatus, the improvement comprising in combination:

an angled, flexible wiper blade member integrally connected to the cylindrical seal wall member at one end by a living hinge member, and at its other end having an open free end, said wiper blade member initially extending radially inwardly of said seal wall member along a first outwardly-directed position, said wiper blade member capable of being readily folded about said living hinge member to a second reverse-angled inwardly-directed position, whereby in said folded position said free end of said wiper blade member is capable of being releasably retained by the gripper element of the mandrel member during casting in place, and further whereby said free end is capable of sealably receiving a drainpipe extended therethrough;

a removable membrane integrally formed across said cylindrical wall member at an end opposite said living hinge member, said membrane having configured score line means for enabling quick severing removal of said membrane from said wall member when desired, to thereby open said seal apparatus to permit insertion of a drainpipe through said open free end of said wiper blade member;

said living hinge member comprising a reduced wall section at a peripheral end of said cylindrical wall member interconnected to a reduced thickness section of said wiper blade member; and wherein said reduced wall section is formed by an obtuse angle between said wall member and said wiper blade member and said reduced thickness portion is formed by a substantially perpendicular angle between said wall member and said wiper blade member.

2. The invention of claim 1, wherein each of said obtuse angle and said perpendicular angle have an apex, and wherein said apex of said perpendicular angle is located axially outwardly along said cylindrical wall member than the apex of said obtuse angle.

3. The invention of claim 1, wherein said score line means comprises at least one notch-shaped groove formed in said removable membrane adjacent the periphery of said cylindrical seal wall member, and including an additional configured score line formed along said removable membrane axially interiorally of said at least one groove, and adjoined with said least one groove, to thereby permit an initial tearing of said score line.

4. The invention of claim 3, wherein said groove is formed on the side of said removable membrane facing axially outwardly from said wall member.

5. The invention of claim 3, and including a pull tab member integrally formed with said removable membrane and extending axially thereof, said pull tab member being partially encompassed by at least a portion of said configured score line means, whereby when a removal force is applied to said pull tab member the tearing of said removable membrane commences adjacent said pull tab member along said configured score line means and continued pulling on said pull tab causes tearing of said removable membrane along said at least one peripheral groove until said removable membrane is fully severed from said seal wall member.

6. The invention of claim 5, wherein said pull tab member includes a pointed base portion whereby a removal force applied to said pull tab member causes the initial tearing of said removable membrane to occur along said pointed base portion.

7. A pipe seal assembly of the type to be cast in place within a poured concrete on-site waste disposal box and having a cylindrical seal wall member having first and second ends, the improvement comprising a tearaway membrane member integrally formed with said cylindrical seal wall member at said first end so as to close off said pipe seal assembly, said membrane member capable of being fully removed so as to create a passage throught the interior of said pipe seal assembly within which a drainpipe may be extended and said tearaway membrane including at least one score line formed on the surface thereof along the peripheral connection of said tearaway membrane with said cylindrical seal wall member, to thereby permit ready removal of said tearaway membrane from said pipe seal assembly when desired, and including a pull tab member formed on said tearaway membrane and configured additional score line means, whereby pulling of said pull tab member causes said additional score line means to tear open, while continued pulling of said tab member causes said peripheral score line means to be completely severed, such that said tearaway membrane is readily fully removed from said pipe seal assembly;

a radially inwardly-extending flexible wiper flange member integrally connected to said second end of said cylindrical seal wall member by a living hinge member, said wiper member initially formed to extend angularly outwardly of said cylindrical seal wall member but being capable of being folded about said living hinge member so as to extend angularly inwardly of said cylindrical seal wall member, whereby said wiper member is capable of being snap-fitted in position upon a casting mandrel when being cast in place in a poured concrete wall, and also capable of slidably and sealably receiving a drainpipe extended therethrough, and wherein said living hinge member comprises a mating integral interconnection of a reduced wall thickness along the periphery of said cylindrical seal wall member at said first end and a reduced thickness portion of said wiper flange member.

\* \* \* \* \*

UNITED STATES PATENT AND TRADEMARK OFFICE
CERTIFICATE OF CORRECTION

PATENT NO. : 5,624,123
DATED : April 29, 1997
INVENTOR(S) : Theodore W. Meyers

It is certified that error appears in the above-indentified patent and that said Letters Patent is hereby corrected as shown below:

Claim 7, Col. 8, Line 65 "throught" should be ---through out---

Signed and Sealed this

Twenty-ninth Day of July, 1997

Attest:

BRUCE LEHMAN

Attesting Officer      Commissioner of Patents and Trademarks